(12) United States Patent
Jimba et al.

(10) Patent No.: US 11,831,052 B2
(45) Date of Patent: Nov. 28, 2023

(54) ELECTRIC POWER SUPPLY SYSTEM, CONTROLLING METHOD OF ELECTRIC POWER SUPPLY SYSTEM, AND STORAGE MEDIUM

(71) Applicant: HONDA MOTOR CO., LTD., Tokyo (JP)

(72) Inventors: Ryo Jimba, Wako (JP); Seiji Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/591,637

(22) Filed: Feb. 3, 2022

(65) Prior Publication Data

US 2022/0302483 A1 Sep. 22, 2022

(30) Foreign Application Priority Data

Mar. 17, 2021 (JP) ................. 2021-043280

(51) Int. Cl.
*H01M 8/04537* (2016.01)
*H01M 8/04858* (2016.01)
(Continued)

(52) U.S. Cl.
CPC ......... *H01M 8/04559* (2013.01); *B60L 58/33* (2019.02); *H01M 8/0494* (2013.01); *H01M 8/04119* (2013.01); *H01M 2250/20* (2013.01)

(58) Field of Classification Search
CPC ......... H01M 8/04559; H01M 8/04119; H01M 8/0494; H01M 2250/20; H01M 8/249;
(Continued)

(56) References Cited

U.S. PATENT DOCUMENTS 10,938,044 B2 * 3/2021 Shiomi ................. H01M 8/043
2005/0147863 A1 * 7/2005 Hiramatsu ........ H01M 8/04395
429/432
(Continued)

FOREIGN PATENT DOCUMENTS

JP 61-072041 5/1986
JP 2004-111266 4/2004
(Continued)

OTHER PUBLICATIONS

Japanese Office Action and Japanese Patent Application No. 2021-043280 dated Feb. 7, 2023.
(Continued)

*Primary Examiner* — Christian Roldan
(74) *Attorney, Agent, or Firm* — AMIN, TUROCY & WATSON, LLP (57) ABSTRACT

An electric power supply system of an embodiment includes a plurality of fuel cell systems having fuel cell stacks, a controller configured to control to perform stable output electric generation in one fuel cell system having one fuel cell stack, in which a degraded state of an electrode is relatively large, among the plurality of fuel cell stacks, and to perform transient response electric generation in other fuel cell system having other fuel cell stack, in which a degraded state of an electrode is relatively small, and a cell voltage sensor.

10 Claims, 6 Drawing Sheets

(51) Int. Cl.
*B60L 58/33* (2019.01)
*H01M 8/04119* (2016.01)

(58) Field of Classification Search
CPC ......... H01M 8/04552; H01M 8/04753; H01M 8/04992; B60L 58/33
USPC .......................................................... 429/432
See application file for complete search history.

(56) References Cited

U.S. PATENT DOCUMENTS

| | | | |
|---|---|---|---|
| 2007/0196706 A1* | 8/2007 | Sasaki | H01M 8/04126 |
| | | | 429/444 |
| 2010/0068576 A1 | 3/2010 | Hamada et al. | |
| 2011/0027679 A1 | 2/2011 | Nonobe | |
| 2014/0329159 A1* | 11/2014 | Ibuka | H01M 8/0606 |
| | | | 429/423 |
| 2017/0214070 A1* | 7/2017 | Wang | H01M 8/04753 |
| 2021/0384531 A1 | 12/2021 | Taruya et al. | |
| 2021/0408564 A1 | 12/2021 | Ikeda | |

FOREIGN PATENT DOCUMENTS

| | | |
|---|---|---|
| JP | 2004-152604 | 5/2004 |
| JP | 2005-123142 | 5/2005 |
| JP | 2006-049151 | 2/2006 |
| JP | 2008-130445 | 6/2008 |
| JP | 2009-238601 | 10/2009 |
| JP | 2013-258111 | 12/2013 |
| JP | 2021-190391 | 12/2021 |
| JP | 2022-022560 | 2/2022 |
| WO | 2008/146928 | 12/2008 |

OTHER PUBLICATIONS

Japanese Office Action for Japanese Patent Application No. 2021-043280 dated Aug. 8, 2023.

* cited by examiner

ELECTRIC POWER SUPPLY SYSTEM, CONTROLLING METHOD OF ELECTRIC POWER SUPPLY SYSTEM, AND STORAGE MEDIUM

CROSS-REFERENCE TO RELATED APPLICATION

Priority is claimed on Japanese Patent Application No. 2021-043280, filed Mar. 17, 2021, the content of which is incorporated herein by reference.

BACKGROUND OF THE INVENTION

Field of the Invention

The present invention relates to an electric power supply system, a controlling method of the electric power supply system, and a storage medium.

Description of Related Art

In the related art, as a technology related to a fuel cell system mounted on a vehicle, a technology of controlling a fuel cell stack such that it is brought into a good electric generating state in a state in which a purge valve for a fuel gas is open when a cell voltage drop of the fuel cell stack is detected is known (for example, see Japanese Unexamined Patent Application, First Publication No. 2004-111266).

SUMMARY OF THE INVENTION

However, power feeding control by a fuel cell system when a plurality of fuel cell systems are mounted on a vehicle has not been considered. Accordingly, power feeding efficiency of an entire fuel cell system may be degraded depending on a control state.

An aspect of the present invention is directed to providing an electric power supply system, a controlling method of the electric power supply system, and a storage medium that are capable of performing recovery from a cell voltage drop while minimizing an influence of the cell voltage drop when a cell voltage drop occurs in one of fuel cell stacks among an electric power supply system in which a plurality of fuel cell systems are coupled and generates electric power.

An electric power supply system, a controlling method of the electric power supply system, and a storage medium according to the present invention employ the following configurations.

(1) An electric power supply system according to an aspect of the present invention is an electric power supply system including: a plurality of fuel cell systems having one or more fuel cell stacks that receive oxidant gas and fuel gas and that perform electric power generation, each of the fuel cell stacks being constituted by stacking a plurality of cell structures, each in which a pair of electrodes that sandwich an electrolyte film are disposed; a controller configured to perform control such that stable output electric generation is performed in one fuel cell system having one fuel cell stack, in which a degraded state of the electrode is relatively large, among the plurality of fuel cell stacks, and transient response electric generation is performed in other fuel cell system having other fuel cell stack, in which a degraded state of the electrode is relatively small; and a plurality of cell voltage sensors configured to detect cell voltages of the plurality of cell structures, wherein, when a cell voltage drop of any one of the plurality of cell structures is detected with reference to outputs of the plurality of cell voltage sensors, the controller controls the fuel cell system having a drop fuel cell stack, which is the fuel cell stack having the cell structure in which the cell voltage thereof has dropped, so that at least the drop fuel cell stack performs stable output electric generation and so that a flow rate control which increases a flow rate of either one of the oxidant gas and the fuel gas supplied to the drop fuel cell stack in comparison with a flow rate of either one of the oxidant gas and the fuel gas before the cell voltage drop has occurred.

(2) In the electric power supply system of the aspect of the above-mentioned (1), when the flow rate of the oxidant gas is increased by the flow rate control, the controller also increases the flow rate of the fuel gas supplied to the drop fuel cell stack in comparison with the flow rate of the fuel gas before the cell voltage drop has occurred.

(3) In the electric power supply system of the aspect of the above-mentioned (1) or (2), when an increase of the cell voltage of the cell structure of the drop fuel cell stack to a predetermined cell voltage or more is detected due to the flow rate control with reference to the output of the cell voltage sensor, the controller controls the plurality of fuel cell systems such that an increased flow rate state of the oxidant gas and/or the fuel gas is eliminated, and such that each of the plurality of fuel cell stacks perform electric power generation in an electric generating state before the cell voltage drop was detected.

(4) The electric power supply system of the aspect of the above-mentioned (3) further includes an output controller configured to control the outputs of the plurality of fuel cell stacks, and when it is detected that the cell voltage of the cell structure of the drop fuel cell stack does not increase to the predetermined cell voltage or more with reference to the output of the cell voltage sensor, the output controller performs output limitation which limits the output of the drop fuel cell stack to a predetermined value or less and performs output compensation control of increasing the output of the other fuel cell stack that performs the transient response electric generation in comparison with the output of the other fuel cell stack before the output limitation was performed.

(5) In the electric power supply system of the aspect of the above-mentioned (4), when the cell voltage sensor detects that the cell voltage drop of the cell structure of the drop fuel cell stack is continuing even after the output limitation, the output controller performs control of stopping electric power generation by the drop fuel cell stack and control of increasing the output of the other fuel cell stack that performs the transient response electric generation in comparison with the output of the other fuel cell stack during the output limitation was performed.

(6) In the electric power supply system of the aspect of the above-mentioned (1), each of the plurality of fuel cell systems includes a plurality of fuel cell stacks, and when the flow rate of the oxidant gas supplied to the drop fuel cell stack is increased during the flow rate control is performed, the flow rate of the fuel gas supplied to the fuel cell stack other than the drop fuel cell stack of the fuel cell system including the drop fuel cell stack is also increased in comparison with the flow rate of the fuel gas before the cell voltage drop has occurred.

(7) In the electric power supply system of the aspect of the above-mentioned (6), when an increase of the cell voltage of the cell structure of the drop fuel cell stack to a predetermined cell voltage or more is detected due to an increase in flow rate of the oxidant gas and/or the fuel gas with reference to the output of the cell voltage sensor, the controller controls the plurality of fuel cell systems so as to perform control of eliminating an increased state of the flow rate of the oxidant gas and/or the fuel gas and to perform electric power generation of each of plurality of fuel cell systems at an electric power generation state before the cell voltage drop was detected.

(8) The electric power supply system of the aspect of the above-mentioned (7) further includes an output controller configured to control the outputs of the plurality of fuel cell stacks, and when it is detected that the cell voltage of the cell structure of the drop fuel cell stack is not increased to a predetermined cell voltage or more with reference to the output of the cell voltage sensor, the output controller performs control of limiting the output of the drop fuel cell stack to a predetermined value or less and performs output complementation control of increasing the output of the fuel cell stack of the other fuel cell system that performs the transient response electric generation in comparison with the output of the fuel cell stack before the output limitation was performed.

(9) In the electric power supply system of the aspect of the above-mentioned (8), when it is detected that the cell voltage of the cell structure of the drop fuel cell stack is continuing to drop even after the output limitation is performed with reference to the output of the cell voltage sensor, the output controller performs control of stopping electric power generation by the drop fuel cell stack and performs output complementation control of increasing the output of the fuel cell stack of the other fuel cell system that performs the transient response electric generation in comparison with the output of the fuel cell stack during the output limitation was performed.

(10) The electric power supply system of the aspect of the above-mentioned (1) includes an air supply unit configured to supply the oxidant gas and/or the fuel gas to the fuel cell stack; and an air supply controller configured to control the air supply unit, and when the drop fuel cell stack is switched from the transient response electric generation to the stable output electric generation, the air supply controller controls the air supply unit to supply the flow rate of the oxidant gas and/or the fuel gas so that a difference between electric power generation amounts obtained by the stable output electric generation before and after the switching can be supplemented by the transient response electric generation.

(11) According to a controlling method of an electric power supply system according to another aspect of the present invention, the electric power supply system including a plurality of fuel cell systems having a fuel cell stack that receives oxidant gas and fuel gas and that performs electric power generation, the fuel cell stack being constituted by stacking a plurality of cell structures, each in which a pair of electrodes that sandwich an electrolyte film are disposed; a controller configured to control to perform stable output electric generation in one fuel cell system having the fuel cell stack, in which a degraded state of the electrode is relatively large, among the plurality of fuel cell stacks, and to perform transient response electric generation in other fuel cell system having the fuel cell stack, in which a degraded state of the electrode is relatively small; and a cell voltage sensor configured to detect a cell voltage of each of the cell structures provided in the fuel cell stack, and when a cell voltage drop of any one of the cell structures is detected with reference to the output of the cell voltage sensor, the controller controls the fuel cell system having the drop fuel cell stack, which is the fuel cell stack having the cell structure, in which the cell voltage thereof has dropped, so that at least the drop fuel cell stack performs stable output electric generation and so that a flow rate control which increases a flow rate of the oxidant gas supplied to the drop fuel cell stack in comparison with a flow rate of the oxidant gas before the cell voltage drop has occurred.

(12) A computer-readable storage medium according to another aspect of the present invention storing a program configured to cause a computer to: acquire states of cell voltages of cell structures of fuel cell stacks of a plurality of fuel cell systems mounted on an electric motor device operated by electric power; acquire demand electric energy from the electric motor device; and control electric power generation of one or more fuel cell systems of the fuel cell systems so as to satisfy the demand electric energy on the basis of the acquired states of the cell voltages of the fuel cell systems.

According to the aspects of the above-mentioned (1) to (12), when a cell voltage drop occurs in one of the fuel cell stacks, recovery of the cell voltage drop can be performed while minimizing an influence of the cell voltage drop.

DETAILED DESCRIPTION OF THE INVENTION

First Embodiment

Hereinafter, embodiments of an electric power supply system, a controlling method of the electric power supply system, and a storage medium of the present invention will be described with reference to the accompanying drawings. The electric power supply system according to the embodiment is mounted on, for example, an electric motor device operated by electric power. The electric motor device includes a moving body such as an electrically driven vehicle, a railway vehicle, a flying object (for example, an aircraft, a drone, or the like), a ship, a robot, or the like. In addition, the electric motor device may include a stationary device (for example, a fuel cell system). Hereinafter, an example in which the electric power supply system is mounted on an electrically driven vehicle will be described. The electrically driven vehicle is, for example, a fuel cell vehicle using electric power generated in a fuel cell as electric power for traveling or electric power for an operation of on-board equipment. The electrically driven vehicle is a two-wheeled, three-wheeled or four-wheeled automobile. In addition, the electrically driven vehicle may be a large vehicle such as a bus, a truck, or the like, on which a plurality of fuel cell systems (to be described below) can be mounted.

[Electrically Driven Vehicle]

Figure 1:
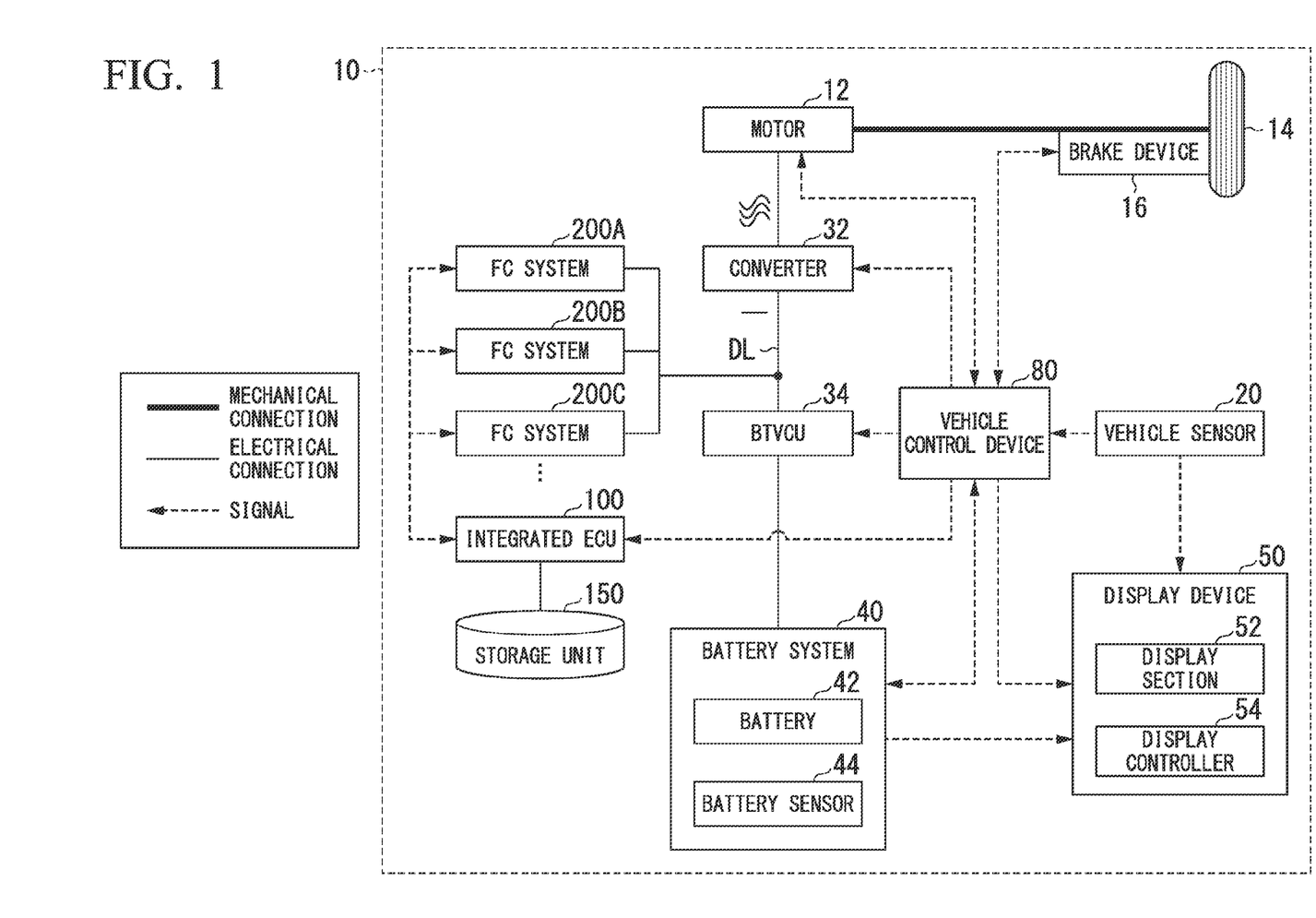
FIG. 1 is a view showing an example of a configuration of an electrically driven vehicle in which an electric power supply system of an embodiment is mounted.

FIG. 1 is a view showing an example of a configuration of the electrically driven vehicle on which the electric power supply system of the embodiment is mounted. As shown in FIG. 1, an electrically driven vehicle 10 includes, for example, a motor 12, a driving wheel 14, a brake device 16, a vehicle sensor 20, a converter 32, a battery voltage control unit (BTVCU) 34, a battery system 40, a display device 50, a vehicle control device 80, an integrated electronic control unit (ECU) 100, a storage unit 150, and one or more fuel cell systems (FC systems) 200. In an example shown in FIG. 1, while a plurality of FC system 200A and 200B are shown, when they are not individually distinguished between, they may be simply referred to as "the FC systems 200." The FC systems 200 are an example of "the fuel cell system." A first controller 246A and a second controller 246B of the FC systems may be simply referred to as "the controllers 246" when they are not individually discriminated.

The motor 12 is, for example, a three-phase alternating current motor. A rotor of the motor 12 is connected to the driving wheel 14. The motor 12 outputs a driving force used for traveling of the electrically driven vehicle 10 to the driving wheel 14 using at least one of the electric power generated by the FC systems 200 and the electric power stored by the battery system 40. In addition, the motor 12 generates power using kinetic energy of the vehicle upon deceleration of the vehicle.

The brake device 16 includes, for example, a brake caliper, a cylinder configured to transmit a hydraulic pressure to the brake caliper, and an electric motor configured to generate a hydraulic pressure in the cylinder. The brake device 16 may include a mechanism configured to transmit the hydraulic pressure generated by an operation of the brake pedal to the cylinder via the master cylinder as a backup. Further, the brake device 16 may be an electronically-controlled hydraulic brake device configured to transmit a hydraulic pressure of the master cylinder to the cylinder.

The vehicle sensor 20 includes, for example, an accelerator position sensor, a vehicle speed sensor, and a brake stepping sensor. The accelerator position sensor is attached to an accelerator pedal that is an example of an operator configured to receive an acceleration instruction by a driver, detects an operation amount of the accelerator pedal, and outputs the operation amount to the vehicle control device 80 as an accelerator position. The vehicle speed sensor includes, for example, wheel speed sensors attached to wheels, and a speed calculator, combines wheel speeds detected by the wheel speed sensors to derive a speed of the vehicle (a vehicle speed), and outputs the vehicle speed to the vehicle control device 80 and the display device 50. The brake depression amount sensor is attached to the brake pedal, detects an operation amount of the brake pedal, and outputs the operation amount to the vehicle control device 80 as a brake depression amount.

The vehicle sensor 20 may include an acceleration sensor configured to detect an acceleration of the electrically driven vehicle 10, a yaw rate sensor configured to detect an angular speed around a vertical axis, an azimuth sensor configured to detect an orientation of the electrically driven vehicle 10, and the like. In addition, the vehicle sensor 20 may include a position sensor configured to detect a position of the electrically driven vehicle 10. The position sensor acquires, for example, positional information of the electrically driven vehicle 10 from a global navigation satellite system (GNSS) receiver or a global positioning system (GPS) mounted in the electrically driven vehicle 10. In addition, the vehicle sensor 20 may include a temperature sensor configured to measure a temperature of the FC systems 200. A variety of information detected by the vehicle sensor 20 is output to the vehicle control device 80.

The converter 32 is, for example, an AC-DC converter. A direct current-side terminal of the converter 32 is connected to a direct current link DL. The battery system 40 is connected to the direct current link DL via the BTVCU 34. The converter 32 converts an alternating current voltage generated by the motor 12 into a direct current voltage and outputs the direct current voltage to the direct current link DL.

The BTVCU 34 is, for example, a boosting type DC-DC converter. The BTVCU 34 boosts the direct current voltage supplied from the battery system 40 to output the boosted direct current voltage to the direct current link DL. The BTVCU 34 outputs the regenerative voltage supplied from the motor 12 or the FC voltage supplied from the FC systems 200 to the battery system 40.

The battery system 40 includes, for example, a battery 42 and a battery sensor 44. The battery 42 includes, for example, a secondary battery such as a lithium ion battery or the like. The battery 42 stores electric power generated in, example, the motor 12 or the FC systems 200, performs discharge to cause the electrically driven vehicle 10 to travels or to operate on-board equipment.

The battery sensor 44 includes, for example, a current sensor, a voltage sensor, and a temperature sensor. The battery sensor 44 detects, for example, a current value, a voltage value, and a temperature of the battery 42. The battery sensor 44 outputs the detected current value, voltage value, temperature, and the like, to the vehicle control device 80.

The battery system 40 may be connected to, for example, external charging equipment to charge the electric power supplied from the charge/discharge device to the battery 42.

The display device 50 includes, for example, a display section 52 and a display controller 54. The display section 52 is, for example, a display section or a head-up display (HUD) provided in the meter or an instrument panel. The display section 52 displays a variety of information according to the control of the display controller 54. The display controller 54 displays an image based on the information output by the battery system 40 or the information output by the FC systems 200 on the display section 52. In addition, the display controller 54 displays the image based on the information output by the vehicle sensor 20 or the vehicle control device 80 on the display section 52. In addition, the display controller 54 displays the image showing the vehicle speed or the like output by the vehicle sensor 20 on the display section 52. In addition, the display device 50 may include a speaker configured to output sound, and may output sound, an alarm, or the like, corresponding to the image displayed on the display section 52.

The vehicle control device 80 controls traveling of the electrically driven vehicle 10, an operation or the like of the on-board equipment, and the like. For example, the vehicle control device 80 controls supply of the electric power charged to the battery system 40, the electric power generated by the FC systems 200, or the like, according to a power requirement from the electrically driven vehicle 10. The power requirement from the electrically driven vehicle 10 is, for example, a total load electric power required to drive or operate a load of the electrically driven vehicle 10. The load includes, for example, auxiliary machinery such as the motor 12, the brake device 16, the vehicle sensor 20, the display device 50, other on-board equipment, or the like. In addition, the vehicle control device 80 may perform traveling control or the like of the electrically driven vehicle 10. Details of functions of the vehicle control device 80 will be described below.

The integrated ECU 100 generally controls, for example, an electric power generation amount of each of the plurality of FC systems (the FC system 200A, 200B, 200C, . . . ) on the basis of the control information or the like from the vehicle control device 80. Details of functions of the integrated ECU 100 will be described below.

The storage unit 150 is realized by, for example, a hard disk drive (HDD), a flash memory, an electrically erasable programmable read only memory (EEPROM), a read only memory (ROM), a random access memory (RAM), or the like. For example, information, a program, and a variety of other information related to a state of a cell voltage of the fuel cell stacks of the FC systems 200 are stored in the storage unit 150.

Each of the FC systems 200 has the same configuration. The first FC system 200A will be exemplarily described. The FC system 200 includes, for example, fuel cells. The fuel cell is a battery configured to generate electric power using, for example, a reaction between fuel of an anode and oxidant of a cathode. The fuel cell generates electric power using, for example, a reaction between hydrogen contained in a fuel gas as fuel and oxygen contained in air as oxidant. The FC system 200 performs electric power generation to an instructed electric power generation amount under control of the integrated ECU 100, and outputs the generated electric power to, for example, the direct current link DL between the converter 32 and the BTVCU 34 to perform electric power feeding. Accordingly, the electric power supplied by the FC systems 200 is supplied to the motor 12 via the converter 32 under control of the vehicle control device 80 or the like, or is supplied to the battery system 40 via the BTVCU 34 to be stored in the battery 42, or electric power required for the other auxiliary machinery is supplied.

[FC System]

Figure 2:
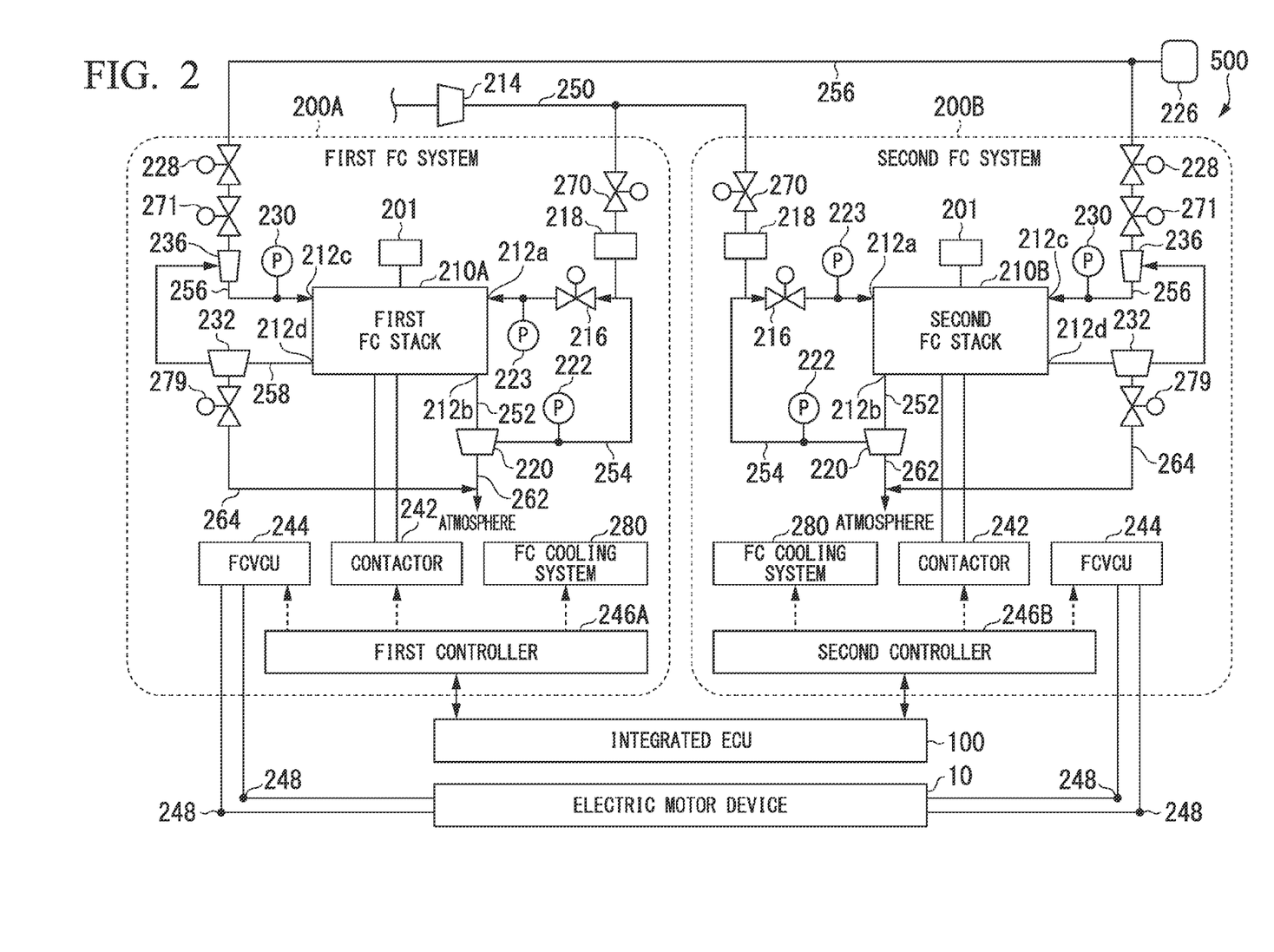
FIG. 2 is a view showing an example of a configuration of the electric power supply system.

The FC systems 200 will be described in detail. FIG. 2 is a view showing an example of a configuration of the FC systems 200 according to the embodiment. The configuration shown in FIG. 2 is able to be applied to each of the plurality of FC systems 200 mounted in the electrically driven vehicle 10. The FC systems 200 according to the embodiment are not limited to the following configuration, and for example, may have any system configuration as long as power is generated by an anode and a cathode. Each of the FC systems 200 shown in FIG. 2 includes, for example, an FC stack 210, a compressor 214, a sealing inlet valve 216, a humidifier 218, a gas-liquid separator 220, an exhaust circulation pump (P) 222, a hydrogen tank 226, a hydrogen supply valve 228, a hydrogen circulation part 230, a gas-liquid separator 232, a temperature sensor (T), a contactor 242, a fuel cell voltage control unit (FCVCU) 244, a control device 246, and an FC cooling system 280.

The FC stack 210A or 210B includes a stacked body (not shown) in which a plurality of fuel cells are stacked, and a pair of end plates (not shown) that sandwich the stacked body from both sides in a stacking direction. The FC stack has a plurality of fuel cell stacks, each constituted by stacking a plurality of cell structures, each in which a pair of electrodes that sandwich an electrolyte film are disposed, and configured to generate electric power by supplying an oxidant gas and a fuel gas. The fuel cell includes a membrane electrode assembly (MEA) and a pair of separators that sandwich the membrane electrode assembly from both sides in the assembly direction. The membrane electrode assembly includes, for example, an anode constituted by an anode catalyst and a gas diffusion layer, a cathode constituted by a cathode catalyst and a gas diffusion layer, and a solid polymer electrolyte film constituted by a cation exchange membrane or the like sandwiched between the anode and the cathode from both sides in a thickness direction.

A fuel gas containing hydrogen as fuel is supplied from the hydrogen tank 226 to the anode. Air that is oxidant gas (reactant gas) containing oxygen as oxidant is supplied from the compressor 214 to the cathode. The hydrogen supplied to the anode is ionized on the anode catalyst by a catalyst reaction, and the hydrogen ions are moved to the cathode via the solid polymer electrolyte film humidified appropriately. Electrons generated according to movement of the hydrogen ions can be taken out to an external circuit (the FCVCU 244 or the like) as direct current. The hydrogen ions moved onto the cathode catalyst of the cathode from the anode react with the oxygen supplied to the cathode and with the electrons on the cathode catalyst to generate water.

The compressor 214 includes a motor or the like driven and controlled by the control device 246, takes in and compresses the air from the outside using a driving force of the motor, sends the compressed air to an oxidant gas supply path 250 connected to the cathode, and thus, pumps the oxidation gas to the fuel cell.

The sealing inlet valve 216 is provided in the oxidant gas supply path 250 that connects the compressor 214 and a cathode supply port 212a configured to supply air to the cathode of the FC stack 210A, and is opened and closed under control of the control device 246. The sealing inlet valve 216 is an example of a flow rate regulating part.

The humidifier 218 humidifies the air sent to the oxidant gas supply path 250 from the compressor 214. For example, the humidifier 218 includes a water-permeable membrane such as a hollow fiber membrane or the like, and adds moisture to the air to humidify the air by bringing the air from the compressor 214 in contact with the moisture via the water-permeable membrane.

An aeration circulation pump 223 is provided between the sealing inlet valve 216 and the cathode supply port 212a. The aeration circulation pump 223 supplies the air flowing into the oxidant gas supply path 250 from the compressor 214 toward the cathode supply port 212a from the sealing inlet valve 216. The aeration circulation pump 223 is an example of an air supply unit.

A flow rate regulating valve 270 is provided in the oxidant gas supply path 250 between the compressor 214 and the humidifier 218. The flow rate regulating valve 270 is opened and closed under control of the controller 246.

The gas-liquid separator 220 discharges a cathode exhaust gas and liquid water, which are discharged to an oxidant gas exhaust path 252 from a cathode exhaust port 212b and that are without being consumed on the cathode, to the atmosphere via an exhaust path 262 of the cathode. In addition, the gas-liquid separator 220 may separate the cathode exhaust gas and the liquid water discharged to the oxidant gas exhaust path 252 and may cause only the separated cathode exhaust gas to enter an exhaust recirculation path 254.

The exhaust circulation pump 222 is provided in the exhaust recirculation path 254, mixes the cathode exhaust gas flowing into the exhaust recirculation path 254 from the gas-liquid separator 220 with the air flowing through the oxidant gas supply path 250 from the sealing inlet valve 216 toward the cathode supply port 212a, and supplies the mixture to the cathode again. The exhaust circulation pump 222 is an example of the air supply unit.

The hydrogen tank 226 stores the hydrogen in a compressed state. The hydrogen supply valve 228 is provided in a fuel gas supply path 256 that connects the hydrogen tank 226 and an anode supply port 212c configured to supply hydrogen to the anode of the FC stack 210. The hydrogen supply valve 228 supplies the hydrogen stored in the hydrogen tank 226 to the fuel gas supply path 256 when opened under control of the control device 246. An injector 271 and an ejector 236 are provided in the fuel gas supply path 256.

The hydrogen circulation part 230 is, for example, a pump configured to circulate and supply the fuel gas to the fuel cell. For example, the hydrogen circulation part 230 circulates the anode exhaust gas, which is discharged to a fuel gas exhaust path 258 from an anode exhaust port 212d and that is without being consumed on the anode, to the fuel gas supply path 256 via the gas-liquid separator 232.

The gas-liquid separator 232 separates the anode exhaust gas and the liquid water circulating from the fuel gas exhaust path 258 to the fuel gas supply path 256 using an action of the hydrogen circulation part 230. The gas-liquid separator 232 supplies the anode exhaust gas separated from the liquid water to the anode supply port 212c of the FC stack 210. The liquid water discharged to the gas-liquid separator 232 is discharged to the atmosphere via a drain pipe 264. A purge valve 279 is provided in the drain pipe 264. The purge valve 279 is an example of the flow rate regulating part.

The temperature sensor detects temperatures of the anode and the cathode of the FC stack 210 and outputs a detection signal (temperature information) to the control device 246.

The contactor 242 is provided between the anode and the cathode of the FC stack 210 and the FCVCU 244. The contactor 242 electrically connects or disconnects the FC stack 210 and the FCVCU 244 on the basis of the control from the control device 246.

The FCVCU 244 is, for example, a boosting type DC-DC converter. The FCVCU 244 is disposed between the anode and the cathode of the FC stack 210 and the electrical load via the contactor 242. The FCVCU 244 boosts a voltage of an output terminal 248 connected to the side of the electrical load to a target voltage determined by the control device 246. For example, the FCVCU 244 boosts the voltage output from the FC stack 210 to the target voltage and outputs the voltage to the output terminal 248.

The control device 246 controls starting, ending, an electric power generation amount, or the like, of electric power generation in the FC system 200 according to the electric power generation control by the integrated ECU 100. The control device 246 performs the control related to temperature adjustment of the FC systems 200 using the FC cooling system 280. The control device 246 may be replaced with a control device such as FC-ECU. The control device 246 may perform power feeding control of the electrically driven vehicle 10 in cooperation with the integrated ECU 100 or the vehicle control device 80.

The FC cooling system 280 cools the FC system 200, for example, when the temperature of the FC stack 210 detected by the temperature sensor is equal to or greater than the threshold, according to the control by the control device 246. For example, the FC cooling system 280 cools the temperature of the FC stack 210 by circulating the coolant through the flow path provided in the FC stack 210 and discharging heat of the FC stack 210. In addition, the FC cooling system 280 may perform the control of heating or cooling the FC stack 210 such that the temperature detected by the temperature sensor is maintained within a predetermined temperature range when the FC system 200 is generating electric power.

[Vehicle Control Device]

Figure 3:
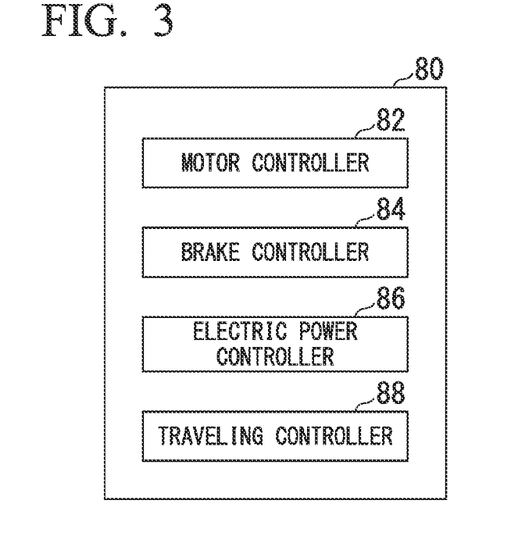
FIG. 3 is a view showing an example of a configuration of a vehicle control device.

FIG. 3 is a view showing an example of a configuration of the vehicle control device 80. The vehicle control device 80 includes, for example, a motor controller 82, a brake controller 84, an electric power controller 86, and a traveling controller 88. Each of the motor controller 82, the brake controller 84, the electric power controller 86, and the traveling controller 88 is realized by executing a program (software) using a hardware processor such as a central processing unit (CPU) or the like. In addition, some or all of these components may be realized by hardware (circuit part; including circuitry) such as large scale integration (LSI), an application specific integrated circuit (ASIC), a field-programmable gate array (FPGA), a graphics processing unit (GPU), or the like, or may be realized by cooperation of software and hardware. The program may be previously stored in a storage device such as an HDD, a flash memory, or the like, of the electrically driven vehicle 10 (a storage device including a non-transient storage medium), stored in a detachable storage medium such as a DVD, a CD-ROM, or the like, or installed in an HDD or a flash memory of the electrically driven vehicle 10 as a storage medium (non-transient storage medium) is mounted on a drive device. The storage device is, for example, the storage unit 150.

The motor controller 82 calculates a driving force required for the motor 12 on the basis of the output of the vehicle sensor 20, and controls the motor 12 to output the calculated driving force.

The brake controller 84 calculates a braking force required for the brake device 16 on the basis of the output of the vehicle sensor 20, and controls the brake device 16 to output the calculated braking force.

The electric power controller 86 calculates demand electric energy required by the battery system 40 and the FC system 200 on the basis of the output of the vehicle sensor 20. For example, the electric power controller 86 calculates a torque to be output by the motor 12 on the basis of the accelerator position and the vehicle speed, and calculates demand electric energy by summing driving shaft load electric power, which is obtained from the torque and a rotation number of the motor 12, and electric power required by auxiliary machinery or the like. In addition, the electric power controller 86 manages a charging status (an electric power storage status) of the battery system 40. For example, the electric power controller 86 calculates a state of charge (SOC; a battery charging rate) of the battery 42 on the basis of the output of the battery sensor 44. For example, the electric power controller 86 executes the control of charging the battery 42 through electric power generation by the FC systems 200 when the SOC of the battery 42 is less than the predetermined value, or outputs information of urging an occupant to perform charging through supply of the electric power from external charging equipment to the display device 50. The electric power controller 86 may perform control of stopping the charging control when the SOC of the battery 42 is larger than the predetermined value or consuming surplus electric power generated by the FC systems 200 using auxiliary machinery or the like.

For example, the traveling controller 88 executes driving control with respect to the electrically driven vehicle 10 on the basis of the information acquired by the vehicle sensor 20. In addition, the traveling controller 88 may execute driving control of the electrically driven vehicle 10 on the basis of map information or information acquired from the monitoring unit (not shown) in addition to the information acquired by the vehicle sensor 20. The monitoring unit includes, for example, a camera configured to image an external space of the electrically driven vehicle 10, radar or light detection and ranging (LIDAR) configured to set the outside of the electrically driven vehicle 10 as a detection range, an object recognition device configured to perform sensor fusion processing on the basis of these outputs, or the like. The monitoring unit estimates a type of an object present around the electrically driven vehicle 10 (in particular, a vehicle, a pedestrian, and a bicycle), and outputs the type to the traveling controller 88 together with information of a position or speed thereof. For example, the driving control is to travel the electrically driven vehicle 10 by controlling steering of the electrically driven vehicle 10 or one or both of acceleration and deceleration. The driving control includes, for example, driving assistance control such as an advanced driver assistance system (ADAS) or the like. The ADAS includes, for example, a lane keeping assistance system (LKAS), an adaptive cruise control system (ACC), a collision mitigation brake system (CMBS), or the like.

[Integrated ECU]

Figure 4:
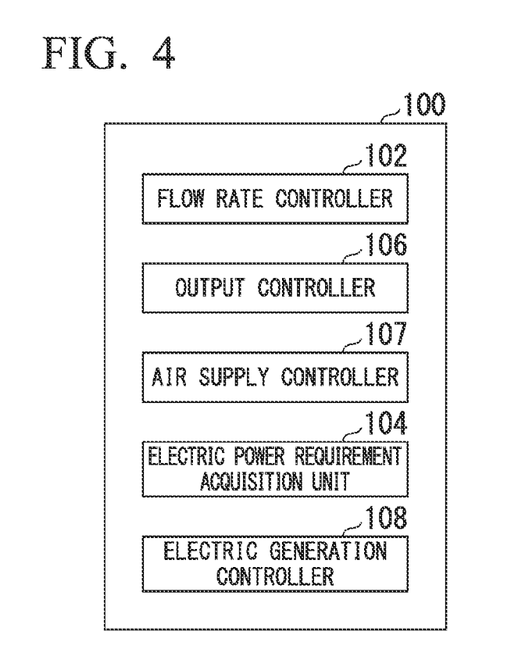
FIG. 4 is a view showing an example of a configuration of an integrated ECU.

FIG. 4 is a view showing an example of a configuration of the integrated ECU 100. The integrated ECU 100 includes, for example, a flow rate controller 102, an electric power requirement acquisition unit 104, an output controller 106, an air supply controller 107, and an electric generation controller 108. Each of the flow rate controller 102, the electric power requirement acquisition unit 104, the output controller 106, and the electric generation controller 108 is realized by executing a program (software) using a hardware processor such as a CPU or the like. Some or all of these components may be realized by hardware (a circuit part; including circuitry) such as LSI, ASIC, FPGA, GPU, or the like, or may be realized by cooperation of software and hardware. The program may be previously stored in a storage device such as an HDD, a flash memory, or the like, of the electrically driven vehicle 10 (a storage device including a non-transient storage medium), stored in a detachable storage medium such as a DVD, a CD-ROM, or the like, or installed on an HDD or a flash memory of the electrically driven vehicle 10 as a storage medium (non-transient storage medium) is mounted on a drive device. The storage device is, for example, the storage unit 150.

The electric power requirement acquisition unit 104 acquires demand electric energy from the electrically driven vehicle 10. For example, the electric power requirement acquisition unit 104 acquires demand electric energy generated in the plurality of FC systems 200 by the vehicle control device 80 (i.e., electric energy except the electric energy which is supplied by the battery system 40 among the demand electric energy required for the entire electrically driven vehicle).

Among each of the FC stacks 210A and 210B of the plurality of FC system 200A and 200B, the flow rate controller 102 controls to perform stable output electric generation in one electric power supply system having FC stack with a relatively large degraded state of the electrode, and to perform transient response electric generation in the other electric power supply system having the FC stack with a relatively small degraded state of the electrode.

The air supply controller 107 controls an operating state of the air supply unit such as the aeration circulation pump 223 or the like. For example, the air supply controller 107 can control a flow rate or a flow speed of the air in the oxidant gas supply path 250 by increasing or decreasing the output of the aeration circulation pump 223. The air supply controller 107 is an example of an air supply controller.

The integrated ECU 100 is not limited to the configuration including all of the flow rate controller 102, the electric power requirement acquisition unit 104, the output controller 106, the air supply controller 107, and the electric generation controller 108. For example, the integrated ECU 100 that does not include the output controller 106, the air supply controller 107, and the electric power requirement acquisition unit 104 may be provided.

In the following description, an example in which the degraded state of the electrode of the first FC stack 210A of the first FC system 200 is relatively larger than that of the electrode of the second FC stack 210B will be exemplarily described. That is, the first FC stack 210A is an example of a dropped fuel cell stack.

A cell voltage of each cell structure provided in each of the FC stacks 210 is detected by a cell voltage sensor 201. The cell voltage sensor 201 detects a cell voltage of the cell structure normally or periodically. A detection result of the cell voltage of the cell structure is stored in the storage unit 150. When the detection result of the cell voltage of the cell structure by the cell voltage sensor 201 is below the predetermined value, the flow rate controller 102 determines that the cell voltage of the cell structure is dropped. When the cell voltage drop is determined, the flow rate controller 102 controls the dropped fuel cell stack (the first FC stack 210A) that is a fuel cell stack having a cell structure, at least a cell voltage is dropped, to perform stable output electric generation, and performs flow rate control of increasing a flow rate of either one of the oxidant gas and the fuel gas supplied to a drop fuel cell stack 210A in comparison with the flow rate before the cell voltage drop.

The stable output electric generation refers to an electric generation state in which the output of the FC stack 210A having the cell structure, a cell voltage of which is dropped, is lowered, and electric power generation is continued.

The transient response electric generation refers to an electric generation state in which, as a result of switching the drop fuel cell stack to the stable output electric generation, the decreased output is supplemented by the other FC system 200B, and the demand electric energy acquired by the electric power requirement acquisition unit 104 can be generated as the entire electric power supply system. The other FC system 200B increases the electric power generation amount to become an electric power generation amount that can correspond to the demand electric energy, which is equivalent to or smaller than the decrease in electric power generation amount of the FC system 200A of the stable output electric generation object. Upon transient response electric generation, for example, the electric power generation amount of the other FC system 200B is increased by the flow rate controller 102.

For example, the flow rate controller 102 controls an opened or closed state of the flow rate regulating valve 270 based on the detection result of the cell voltage sensor 201, and adjusts an oxidant gas supply quantity. In the flow rate control, an opened or closed state and an opening amount of the valve provided in each of the flow paths of the fuel gas and the oxidant gas are adjusted, an output of the pump is adjusted, and a flow rate of a distribution channel for fuel is controlled. A method of controlling a flow rate is selected according to a state of a cell voltage of the cell structure.

For example, when the flow rate control of increasing the flow rate of the oxidant gas is performed, the flow rate controller 102 also increases the flow rate of the fuel gas supplied to the first FC stack 210A that is the dropped fuel cell stack in comparison with the flow rate before the cell voltage drop.

After the flow rate controller 102 starts the flow rate control, when the cell voltage sensor 201 detects that the cell voltage of the cell structure of the first FC stack 210A that is the dropped fuel cell stack is increased to a predetermined cell voltage or more, the flow rate controller 102 releases an increased state of the flow rate of the oxidant gas and/or fuel gas, and simultaneously, controls each of the plurality of FC stack 210A and 210B to perform electric power generation in the electric generation state before detection of the cell voltage drop.

The output controller 106 controls the outputs of the plurality of FC stacks 210A and 210B. The output controller 106 performs output limitation that limits the output of the dropped fuel cell stack 210A to a predetermined value or less and performs output complementation control of increasing the output of the second FC stack 210B that performs the transient response electric generation in comparison with the output before the output limitation when the cell voltage sensor 201 detects that the cell voltage of the cell structure of the drop fuel cell stack 210A is not increased to the predetermined cell voltage or more.

When the cell voltage sensor 201 detects that the cell voltage drop of the cell structure of the drop fuel cell stack 210A is continued even after the output limitation, the output controller 106 performs control of increasing the output of the other FC stack 210B that performs the transient response electric generation in comparison with the output upon output limitation while stopping electric power generation by the drop fuel cell stack 210A.

[Processing Flow]

Figure 5:
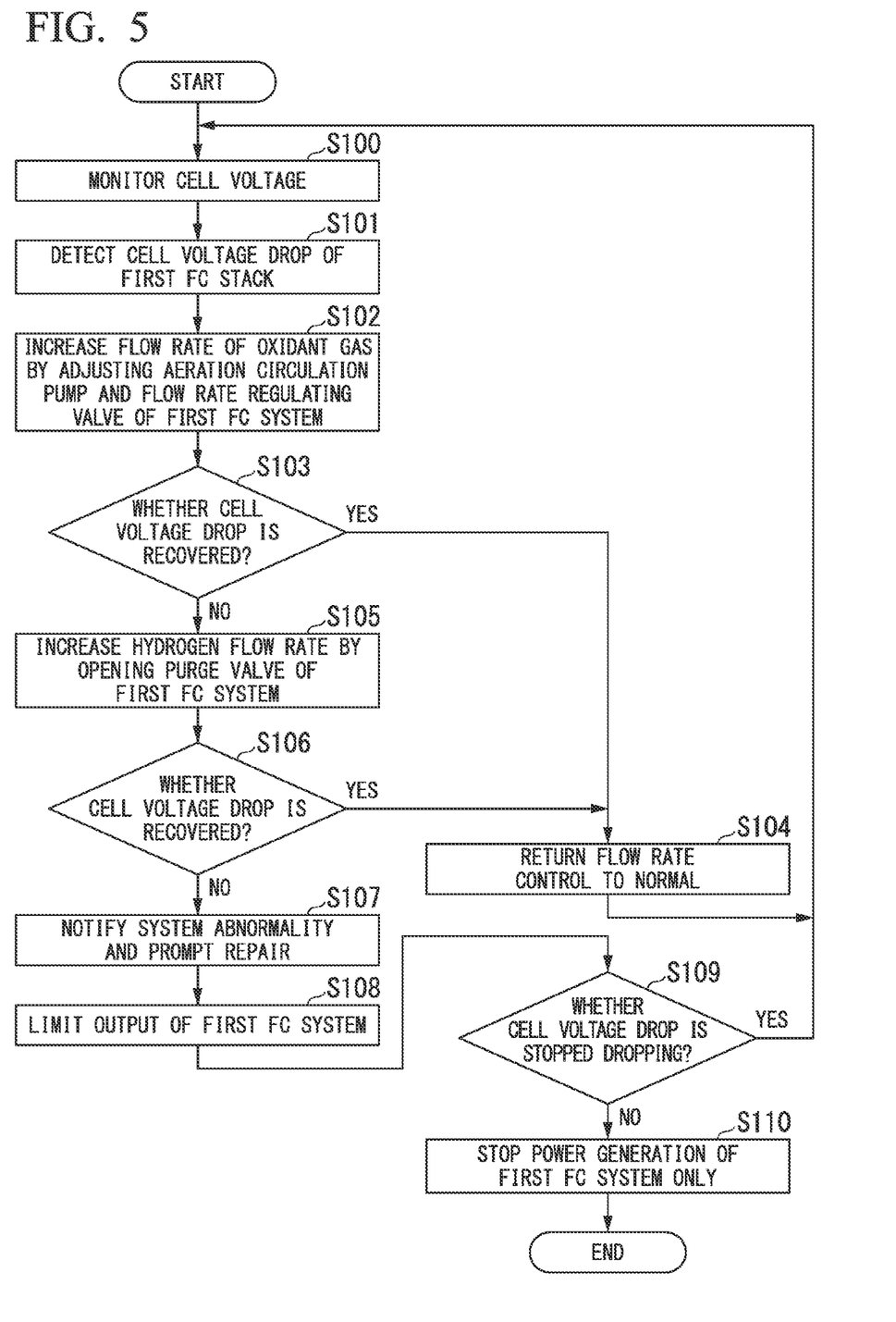
FIG. 5 is a flowchart showing an example of a flow of processing executed by a computer of the electric power supply system according to the embodiment.

Hereinafter, a flow of processing executed by a computer of the electric power supply system according to the embodiment will be described using a flowchart. In the following processing, processing of electric power feeding control by the plurality of FC systems mounted on the electrically driven vehicle 10 will be mainly described. FIG. 5 is a flowchart showing an example of a flow of processing executed by the computer of the electric power supply system according to the embodiment. For example, the processing of FIG. 5 is repeatedly executed at a predetermined timing or a predetermined period while the electrically driven vehicle 10 is started.

In the example of FIG. 5, first, the integrated ECU 100 monitors a cell voltage (step S100). Specifically, the integrated ECU 100 acquires a cell voltage value of the cell structure detected by the cell voltage sensor 201 included in each of the FC systems 200. In the processing of step S100, the integrated ECU 100 may store the acquired cell voltage information in the storage unit 150.

Next, the integrated ECU 100 determines whether a cell voltage drop of each of the FC stacks 210 is present on the basis of the information of the cell voltage acquired in step S100, and detects a cell voltage drop (S101). When the cell voltage drop in the first FC stack 210A is detected, the flow rate controller 102 adjusts opening amounts of the aeration circulation pump 223 and the flow rate regulating valve 270 of the first FC system 200A, and increases a flow rate of the air supplied from the oxidant gas supply path 250 (step S102).

The integrated ECU 100 determines whether the cell voltage drop of the first FC stack 210A is recovered as a result of step S102 (step S103). When it is determined that the cell voltage drop of the first FC stack 210A is recovered (YES), the flow rate control is returned to normal control (step S104). When returned to the normal control, the cell voltage monitoring in step S100 is continued. When it is determined that the cell voltage drop of the first FC stack 210A in step S103 is not recovered (NO), the flow rate controller 102 performs control of opening the purge valve 279 of the first FC system 200A and increasing a flow rate of the fuel gas (step S105).

The integrated ECU 100 determines whether the cell voltage drop of the first FC stack 210A is recovered as a result of step S105 (step S106). When it is determined that the cell voltage drop of the first FC stack 210A is recovered (YES), the flow rate control is returned to the normal control (step S104). When returned to the normal control, the cell voltage monitoring of step S100 is continued. When it is determined that the cell voltage drop of the first FC stack 210A is not recovered in step S106 (NO), the cell voltage drop is not caused by closing of the gas flow path close due to condensed water, and another failure diagnosis needs to be performed. The integrated ECU 100 determines that the system is abnormal, and transmits a signal that prompts system abnormality and repair to the vehicle control device 80 (step S107). The vehicle control device 80 transmits information of system abnormality and repair using the display device 50, a sound system, or the like, of the electrically driven vehicle 10.

Next, the first controller 246A performs output limitation control (S108). The output controller 106 controls outputs of the plurality of FC stacks 210A and 210B. The output controller 106 performs output limitation that limits the output of the drop fuel cell stack 210A to a predetermined value or less when the cell voltage sensor 201 detects that the cell voltage of the cell structure of the drop fuel cell stack 210A is not increased to the predetermined cell voltage or more. Simultaneously, the output controller 106 performs output complementation control of increasing the output of the second FC stack 210B that performs the transient response electric generation in comparison with the output before the output limitation.

As a result of the output limitation of the first FC system 200A, when sediment in the flow path of the fuel gas and/or oxidant gas is removed, the cell voltage drop can be eliminated. The integrated ECU 100 determines whether the cell voltage drop of the first FC stack 210A is stopped dropping (step S109). When it is determined that the cell voltage drop of the first FC stack 210A is recovered (YES), the processing returns to the cell voltage monitoring (step S100). In this case, when the next FC system 200 is started, an electric generation state is returned to the electric generation state before the cell voltage drop is detected. When it is determined that the cell voltage drop of the first FC stack 210A in step S109 is not recovered (NO), the integrated ECU 100 determines that the system is abnormal, stops electric power generation of the first FC system 200A only, and continues electric power generation of the other FC system 200 (step S110). Here, the integrated ECU 100 may perform control of increasing the output of the FC stack 210B in the other FC system 200B. Accordingly, the processing of the flowchart is terminated.

When it is determined that the cell voltage drop of the first FC stack 210A is recovered (YES), the flow rate control may be returned to the normal control (step S104). When returned to the normal control, the cell voltage monitoring of step S100 is continued.

According to the above-mentioned embodiment, when the cell voltage drop occurs in one of the plurality of FC stacks 210, recovery control from the cell voltage drop can be performed while minimizing an influence of the cell voltage drop.

Figure 6:
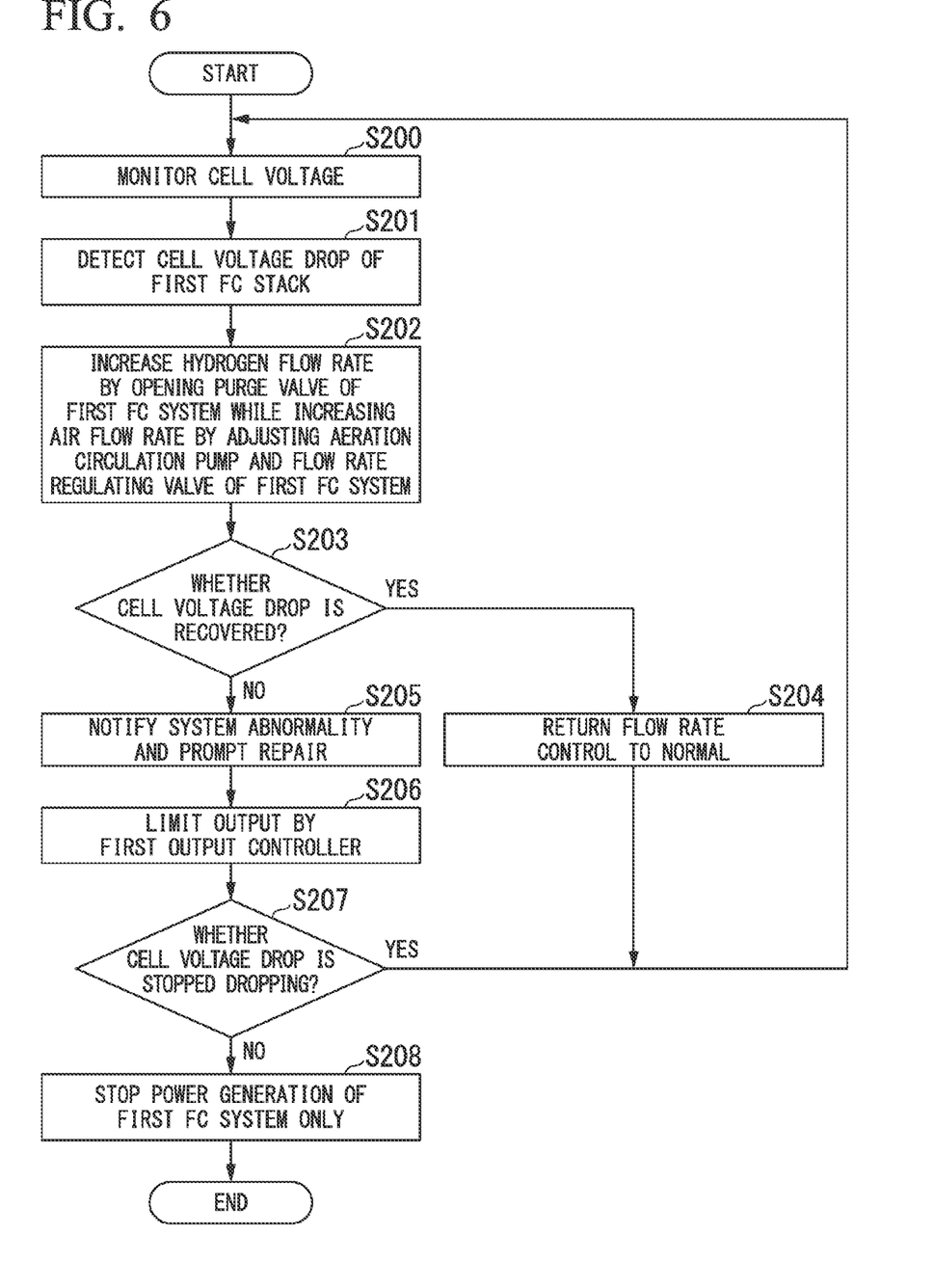
FIG. 6 is a flowchart showing an example of a flow of processing executed by the computer of the electric power supply system according to the embodiment.

The processing flow is not limited to the example shown in FIG. 5. For example, it may be a processing flow such as a flowchart shown in FIG. 6. FIG. 6 is a flowchart showing another example of a flow of processing executed by the computer of the electric power supply system. For example, the processing of FIG. 6 is repeatedly executed at a predetermined timing or a predetermined period while the electrically driven vehicle 10 is started.

In the example of FIG. 6, first, the integrated ECU 100 monitors a cell voltage (step S200). Specifically, the integrated ECU 100 acquires a cell voltage value of the cell structure detected by the cell voltage sensor 201 included in each of the FC systems 200. In the processing of step S200, the integrated ECU 100 may store the acquired cell voltage information in the storage unit 150.

Next, the integrated ECU 100 determines whether the cell voltage drop in each of the FC stacks 210 is present on the basis of the information of the cell voltage acquired in step S200, and detects a cell voltage drop (S201). When the cell voltage drop in the first FC stack 210A is detected, the flow rate controller 102 adjusts opening amounts of the aeration circulation pump 223 and the flow rate regulating valve 270 of the first FC system 200A, increases a flow rate of the air supplied from the oxidant gas supply path 250, opens the purge valve 279 of the first FC system 200A, and increases a flow rate of hydrogen that is a fuel gas (step S202). In this way, the flow rate controller 102 can eliminate the cell voltage drop within a short time by simultaneously increasing the flow rate of the fuel gas and the flow rate of the oxidant gas. As a result, output stability of the entire electric power supply system can be further increased.

Next, the integrated ECU 100 determines whether the cell voltage drop of the first FC stack 210A is recovered as a result of step S202 (step S203). When it is determined that the cell voltage drop of the first FC stack 210A is recovered (YES), the flow rate control is returned to the normal control (step S204). When returned to the normal control, the cell voltage monitoring of step S200 is continued. When it is determined that the cell voltage drop of the first FC stack 210A in step S203 is not recovered (NO), the cell voltage drop is not caused by closing of the gas flow path due to the condensed water, and another failure diagnosis needs to be performed. The integrated ECU 100 determines that the system is abnormal, and transmits a signal that prompts system abnormality and repair to the vehicle control device 80 (step S205). The vehicle control device 80 transmits information of the system abnormality and repair using the display device 50, the sound system, or the like, of the electrically driven vehicle 10.

Next, the first controller 246A performs output limitation control (S206). The output controller 106 limits the output of the first FC system 200A. For example, the output controller 106 performs control of reducing the output of the aeration circulation pump 223 or reducing the flow rate of the hydrogen circulation part 230, reduces the flow rate of the fuel gas or oxidant gas, and limits the output of the first FC system 200A. Here, the integrated ECU 100 may control the second controller 246B such that the transient response electric generation is performed in the second FC system 200B.

As a result of the output limitation of the first FC system 200A, when sediment in the flow path of the fuel gas and/or oxidant gas is removed, the cell voltage drop can be eliminated. The integrated ECU 100 determines whether the cell voltage drop of the first FC stack 210A is stopped dropping (step S207). When it is determined that the cell voltage drop of the first FC stack 210A is recovered (YES), it returns to the cell voltage monitoring (step S200). In this case, when the next FC system 200 is started, the electric generation state is returned to the electric generation state before the cell voltage drop is detected. When it is determined that the cell voltage drop of the first FC stack 210A is not recovered in step S207 (NO), the integrated ECU 100 determines that the system is abnormal, stops electric power generation of the first FC system 200A only, and continues electric power generation of the other FC system 200 (step S208). Here, the integrated ECU 100 may perform control of increasing the output of the FC stack 210B in the other FC system 200B. Accordingly, the processing of the flowchart is terminated.

When it is determined that the cell voltage drop of the first FC stack 210A is recovered (YES), the flow rate control may be returned to the normal control (step S204). When returned to the normal control, the cell voltage monitoring of step S200 is continued.

According to the above-mentioned embodiment, when the cell voltage drop occurs in one of the plurality of FC stacks 210, recovery control from the cell voltage drop can be performed while minimizing an influence of the cell voltage drop.

Second Embodiment

Next, a second embodiment of the electric power supply system will be described with reference to FIG. 7. In the description of the embodiment, the same components as in the first embodiment are designated by the same reference signs, and description thereof will be omitted. In the embodiment, the plurality of FC stacks 210 are disposed in series in each of the FC systems 200A. In the electric power supply system, the two FC stacks 210 are disposed in series. Three or more FC stacks 210 may be disposed in series.

Figure 7:
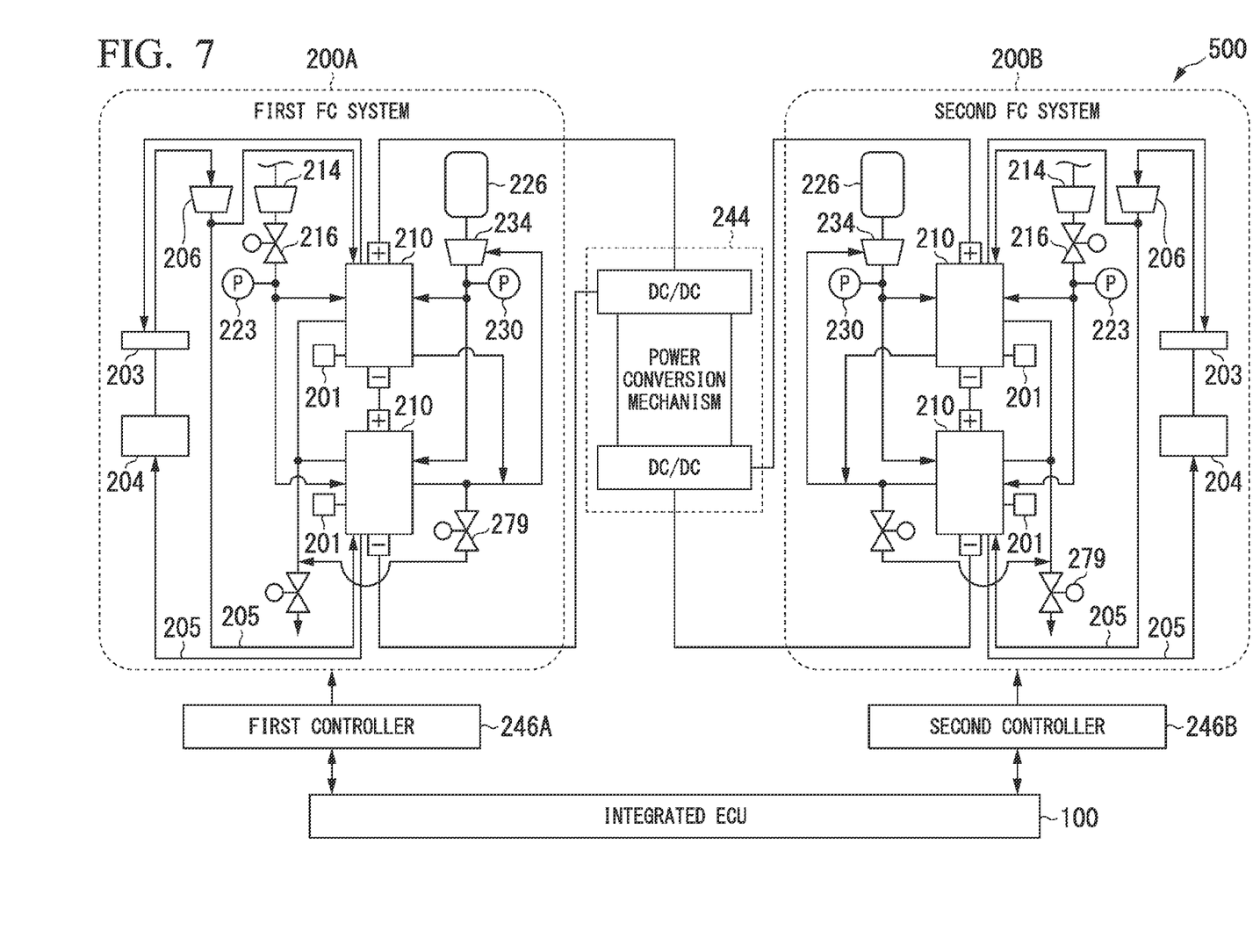
FIG. 7 is a view showing an example of a configuration of the electric power supply system according to the embodiment.

An electric power supply system 500 showing a schematic configuration of FIG. 7 includes a plurality of FC systems 200A and 200B, and an electric power conversion unit. The plurality of FC systems 200A and 200B have the same configuration. The first FC system 200A will be exemplarily described. The FC system 200 includes two FC stacks 210, a fuel gas supply part, a supply part for oxidant gas, and a cooling mechanism. In the fuel gas supply part, the fuel gas supplied from the hydrogen tank 226 and separated by the gas-liquid separator is supplied to each of the FC stacks 210 that are disposed in series. Even in the oxidant gas supply part, the oxidant gas is supplied to each of the FC stacks 210 that are disposed in series. Similar to the first embodiment, a flow rate regulating part for fuel gas (for example, the hydrogen circulation part 230, an injector 231, the purge valve 279, and the like) are provided in the flow path for fuel gas, and a flow rate regulating part for oxidant gas (for example, the aeration circulation pump 223, the flow rate regulating valve 270, the sealing inlet valve 216, and the like) are independently provided in the flow path for oxidant gas. The cell voltage sensor 201 is individually provided in each of the FC stacks 210.

A cooling mechanism 202 includes a radiator 203, a coolant tank 204, a coolant pump 206, and a fan, a thermostat, and the like, which are not shown. The radiator 203 is a heat exchanger configured to radiate a high temperature coolant flowing out from a coolant flow path 205. The coolant is, for example, water. In addition, the coolant may be water containing, for example, ethylene glycol, or may be another coolant. The radiator 203 radiates heat through heat exchange between the coolant flowing out from the coolant flow path 205 and the air. The coolant pump 206 compresses the coolant flowing into the coolant flow path 205 from upstream. As the coolant circulates through the coolant flow path 205, the temperature of the FC stack 210A is adjusted.

In the electric power supply system 500, the first controller 246A and the second controller 246B of each of the FC systems 200 control operations of the FC systems 200 under control of the integrated ECU 100.

For example, the flow rate controller 102 also increases the flow rate of the fuel gas supplied to each of the FC stacks 210 of the first FC system 200A that is a drop fuel cell system in comparison with the flow rate before the cell voltage drop when the flow rate of the oxidant gas supplied to each of the FC stacks 210 is increased upon flow rate control. According to the flow rate control, since the first FC stack 210A that is dropped increases the flow rates of the oxidant gas and the fuel gas, the closing of the gas flow path due to the condensed water can be eliminated. As a result, the closing of the gas flow path can be eliminated, and recovery of the cell voltage can be effectively tried.

For example, when the cell voltage sensor 201 detects that the cell voltage of the cell structure of the first FC stack 210A that is the drop fuel cell stack is increased to the predetermined cell voltage or more according to an increase in flow rate of the oxidant gas and/or fuel gas, the flow rate controller 102 controls each of the FC systems 200 to perform electric power generation in an electric generation state before the cell voltage drop is detected while controlling to release the increased state of the flow rate of the oxidant gas and/or fuel gas. According to the flow rate control, when the cell voltage drop of the first FC stack 210A is eliminated, the gas flow rate is rapidly decreased to become a state before the drop. As a result, wasting of the fuel gas can be prevented.

For example, when the cell voltage sensor 201 detects that the cell voltage of the cell structure of the first FC stack 210A that is the drop fuel cell stack is not increased to the predetermined cell voltage or more, the output controller 106 performs the output complementation control of increasing the output of the FC stack 210B of the second FC system 200B that performs the transient response electric generation in comparison with the output before output limitation while controlling to limit the output of the first FC stack 210A to a predetermined value or more. According to such output complementation control, a decrease in output of the first FC system 200A can be stored in the second FC system 200B. Accordingly, even when the output of the first FC stack 210A is decreased, the electric power supply system can be continuously operated.

For example, when the cell voltage sensor detects that the cell voltage of the cell structure of the first FC stack 210A that is the dropped fuel cell stack is also dropped continuously after the output limitation, the output controller 106 performs control to stop electric power generation by the first FC stack 210A and performs the output complementation control of increasing the output of the second FC stack 210B of the second FC system 200B that performs the transient response electric generation in comparison with the output upon output limitation. According to such output complementation control, even when the output of the first FC stack 210A is stopped, the electric power supply system can be continuously operated. In addition, according to the output complementation control, various recovery actions of the first FC stack 210A can be executed while maintaining the operation of the electric power supply system.

For example, the air supply controller 107 can control the air supply unit to supply a flow rate of the oxidant gas and/or fuel gas supplemented through transient response electric generation according to a difference between the electric power generation amounts according to the stable output electric generation before and after switching of the electric generation state when the first FC stack 210 is switched from the transient response electric generation to the stable output electric generation.

According to the above-mentioned embodiment, each of the FC systems 200 includes the cell voltage sensor 201 and the control device 246. For this reason, the FC system 200A having the drop fuel cell stack 210A can be controlled independently from the other FC system 200B.

According to the above-mentioned embodiment, in the electric power supply system, a cell voltage sensor 201 that detects a cell voltage drop of the cell structures of the FC stacks 210 of the plurality of FC systems 200 mounted in the electrically driven vehicle 10 (an example of the electric motor device) and a controller that determines the FC system 200 in which the cell voltage drop based on the detection result of the cell voltage sensor 201 occurs, that controls the dropped fuel cell stack to perform the stable output electric generation, and that controls the other FC system 200 to perform the transient response electric generation, are provided. For this reason, in the electric power supply system including the plurality of FC systems 200, when the cell voltage drop occurs in some of the FC stacks 210, recovery control from the cell voltage drop can be performed by increasing the minimum required hydrogen fuel and/or air flow rate. For this reason, it is possible to prevent deterioration of electric power generation efficiency and reduce wasting of the hydrogen fuel.

According to the above-mentioned embodiment, even when the cell voltage drop is not recovered even though recovery control of the dropped cell voltage is attempted, the control that does not stop the electric power generation of the entire system is performed. For this reason, it is possible to avoid the situation where the output cannot be taken out from the electric power supply system.

According to the above-mentioned embodiment, due to the integrated ECU 100 including the flow rate controller 102 configured to control a hydrogen flow rate and/or an air flow rate of one or more FC systems of the plurality of FC systems 200 on the basis of the state of the cell voltage of the FC stack 210 of each of the plurality of FC systems 200 acquired by the cell voltage sensor 201, even when the cell voltage drop occurs, it is possible to minimize wasting of the fuel gas and achieve recovery of the output. As a result, system efficiency (electric power generation efficiency, electric power feeding efficiency, or the like) of the FC systems 200 can be further improved.

According to the above-mentioned embodiment, when the cell voltage drop is not recovered even when the flow rate control is performed by the flow rate controller 102, a further cell voltage drop is avoided by limiting only the output taken out from the dropped fuel cell stack 210A. Accordingly, a decrease in output of the entire system can be suppressed to the minimum.

According to the above-mentioned embodiment, when a cell voltage drop width is further increased even though the flow rate control by the flow rate controller 102 is performed, electric power generation of the FC system 200A, which includes the drop fuel cell stack 210A, is stopped, and the driving is continued by the remaining FC systems 200B. Accordingly, in a duration until obstacles are removed by executing maintenance with respect to the FC system 200A having the dropped fuel cell stack 210A, it is possible to avoid the situation where the output cannot be taken out from the electric power supply system at all.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An electric power supply system comprising:
    a plurality of fuel cell systems having one or more fuel cell stacks configured to receive oxidant gas and fuel gas and perform electric power generation, each of the fuel cell stacks being constituted by stacking a plurality of cell structures, each in which a pair of electrodes that sandwich an electrolyte film are disposed;
    a controller programmed such that stable output electric generation is performed in one of the plurality of fuel cell systems having one fuel cell stack, in which a degraded state of the electrode is relatively large, among the plurality of fuel cell stacks, and transient response electric generation is performed in another of the plurality of fuel cell systems having other fuel cell stack, in which a degraded state of the electrode is relatively small; and
    a plurality of cell voltage sensors configured to detect cell voltages of the plurality of cell structures,
    wherein, when a cell voltage drop of any one of the plurality of cell structures is detected with reference to outputs of the plurality of cell voltage sensors, the controller controls the one fuel cell system having a drop fuel cell stack, which is a fuel cell stack having a cell structure in which the cell voltage thereof has dropped, so that at least the drop fuel cell stack performs the stable output electric generation and so that a flow rate control which increases a flow rate of either one of the oxidant gas and the fuel gas supplied to the drop fuel cell stack in comparison with a flow rate of either one of the oxidant gas and the fuel gas before the cell voltage drop has occurred.

2. The electric power supply system according to claim 1, wherein, when the flow rate of the oxidant gas is increased by the flow rate control, the controller also increases the flow rate of the fuel gas supplied to the drop fuel cell stack in comparison with the flow rate of the fuel gas before the cell voltage drop has occurred.

3. The electric power supply system according to claim 1, wherein, when an increase of the cell voltage of the cell structure of the drop fuel cell stack to a predetermined cell voltage or more is detected due to the flow rate control with reference to the output of one of the plurality of the cell voltage sensors, the controller controls the plurality of fuel cell systems such that an increased flow rate state of the oxidant gas and/or the fuel gas is eliminated, and such that each of the plurality of fuel cell stacks perform electric power generation in an electric generating state before the cell voltage drop was detected.

4. The electric power supply system according to claim 3, further comprising an output controller configured to control the outputs of the plurality of fuel cell stacks,
    wherein, when it is detected that the cell voltage of the cell structure of the drop fuel cell stack does not increase to the predetermined cell voltage or more with reference to the output of the cell voltage sensor, the output controller performs output limitation which limits the output of the drop fuel cell stack to a predetermined value or less and performs output compensation control of increasing the output of another fuel cell stack that performs the transient response electric generation in comparison with the output of the other fuel cell stack before the output limitation was performed.

5. The electric power supply system according to claim 4, wherein, when the cell voltage sensor detects that the cell voltage drop of the cell structure of the drop fuel cell stack is continuing even after the output limitation, the output controller performs control of stopping electric power generation by the drop fuel cell stack and control of increasing the output of the other fuel cell stack that performs the transient response electric generation in comparison with the output of the other fuel cell stack during the output limitation was performed.

6. The electric power supply system according to claim 1, wherein each of the plurality of fuel cell systems comprises a plurality of fuel cell stacks, and
    wherein, when the flow rate of the oxidant gas supplied to the drop fuel cell stack is increased during the flow rate control is performed, the flow rate of the fuel gas supplied to a fuel cell stack other than the drop fuel cell stack of the fuel cell system is also increased in comparison with the flow rate of the fuel gas before the cell voltage drop has occurred.

7. The electric power supply system according to claim 6, wherein, when an increase of the cell voltage of the cell structure of the drop fuel cell stack to a predetermined cell voltage or more is detected due to an increase in flow rate of the oxidant gas and/or the fuel gas with reference to the output of the cell voltage sensor, the controller controls the plurality of fuel cell systems so as to perform control of eliminating an increased state of the flow rate of the oxidant gas and/or the fuel gas and to perform electric power generation of each of plurality of fuel cell systems at an electric power generation state before the cell voltage drop was detected.

8. The electric power supply system according to claim 7, further comprising an output controller configured to control the outputs of the plurality of fuel cell stacks,
    wherein, when it is detected that the cell voltage of the cell structure of the drop fuel cell stack is not increased to a predetermined cell voltage or more with reference to the output of the plurality of cell voltage sensors, the output controller performs control of limiting the output of the drop fuel cell stack to a predetermined value or less and performs output complementation control of increasing the output of the fuel cell stack of the other fuel cell system that performs the transient response electric generation in comparison with the output of the fuel cell stack before the output limitation was performed.

9. The electric power supply system according to claim 8, wherein, when it is detected that the cell voltage of the cell structure of the drop fuel cell stack is continuing to drop even after the output limitation is performed with reference to the output of the cell voltage sensor, the output controller performs control of stopping electric power generation by the drop fuel cell stack and performs output complementation control of increasing the output of the fuel cell stack of the other fuel cell system that performs the transient response electric generation in comparison with the output of the fuel cell stack during the output limitation was performed.

10. The electric power supply system according to claim 1, comprising:
- an air supply unit configured to supply the oxidant gas and/or the fuel gas to one of the plurality of the fuel cell stack; and
- an air supply controller configured to control the air supply unit,
- wherein, when the drop fuel cell stack is switched from the transient response electric generation to the stable output electric generation, the air supply controller controls the air supply unit to supply the flow rate of the oxidant gas and/or the fuel gas so that a difference between electric power generation amounts obtained by the stable output electric generation before and after the switching can be supplemented by the transient response electric generation.

* * * * *